United States Patent [19]

Hinte

[11] Patent Number: 5,516,140

[45] Date of Patent: May 14, 1996

[54] TOW BAR ASSEMBLY

[75] Inventor: Thomas M. Hinte, Williamsburg, Va.

[73] Assignee: Hinte Products, Inc., Riviera Beach, Fla.

[21] Appl. No.: 418,200

[22] Filed: Apr. 7, 1995

[51] Int. Cl.⁶ ...................................................... B60D 1/14
[52] U.S. Cl. ........................ 280/494; 280/491.1; 280/495
[58] Field of Search ........................... 280/491.1, 491.3, 280/491.4, 491.5, 492, 493, 494, 495, 504

[56] References Cited

U.S. PATENT DOCUMENTS

| | | | |
|---|---|---|---|
| 2,120,422 | 6/1938 | Williams et al. | 280/492 |
| 3,419,285 | 12/1968 | Morehouse et al. | 280/491.4 X |
| 3,979,138 | 9/1976 | George et al. | 280/478.1 |
| 4,073,508 | 2/1978 | George et al. | 280/478.1 |
| 4,326,730 | 4/1982 | Tomen | 280/502 |
| 4,714,264 | 12/1987 | Woestelandt | 280/456.1 |
| 4,856,805 | 8/1989 | Davis | 280/491.4 |
| 4,958,847 | 9/1990 | Williams | 280/502 |
| 4,962,830 | 10/1990 | Potts | 184/6.4 |
| 5,000,473 | 3/1991 | Johnson | 280/491.1 |
| 5,039,120 | 8/1991 | Stowe | 280/204 |
| 5,213,396 | 5/1993 | Avery et al. | 303/7 |
| 5,232,240 | 8/1993 | Johnson | 280/491.5 |
| 5,308,100 | 5/1994 | Heider et al. | 280/474 |
| 5,316,330 | 5/1994 | Bergeron | 280/477 |
| 5,342,076 | 8/1994 | Swindall | 280/479.2 |
| 5,346,243 | 9/1994 | Boeck | 280/478.1 |
| 5,354,087 | 10/1994 | Head | 280/490.1 |

FOREIGN PATENT DOCUMENTS 1171112  7/1984  Canada ............................... 280/491.4

OTHER PUBLICATIONS

Advertisement in Automatic Towing Products Division.
Advertisiement—Roadmaster, Inc.

Primary Examiner—Margaret A. Focarino
Assistant Examiner—Victor E. Johnson
Attorney, Agent, or Firm—Gifford, Krass, Groh, Sprinkle, Patmore, Anderson & Citkowski

[57] ABSTRACT

A collapsible tow bar assembly adapted to extend between a towing vehicle and a towed vehicle. A frame is provided which includes a bearing element secured to the front end of the frame and a mounting element secured to the rear end of the frame. The mounting element is adapted to be selectively connected to the receiver hitch of a towing vehicle, while the bearing element extends rearward toward the towed vehicle. A pair of elongated, telescopic swing arms are pivotally secured to the bearing element and extend to the towed vehicle for attachment thereto. The bearing element further includes a yoke rotatable about a ball joint having at least two degrees of freedom which allows for movement of the swing arms in both vertical and horizontal planes. The swing arms further include pivot flanges that are pivotally secured to the swing arms at an end nearest the towed vehicle. A pair of tow vehicle mounting brackets extend from the frame of the towed vehicle vertically upward, such that when not in use, the tow bar assembly may be collapsed and securely stored adjacent the rear bumper of the towing vehicle.

8 Claims, 4 Drawing Sheets

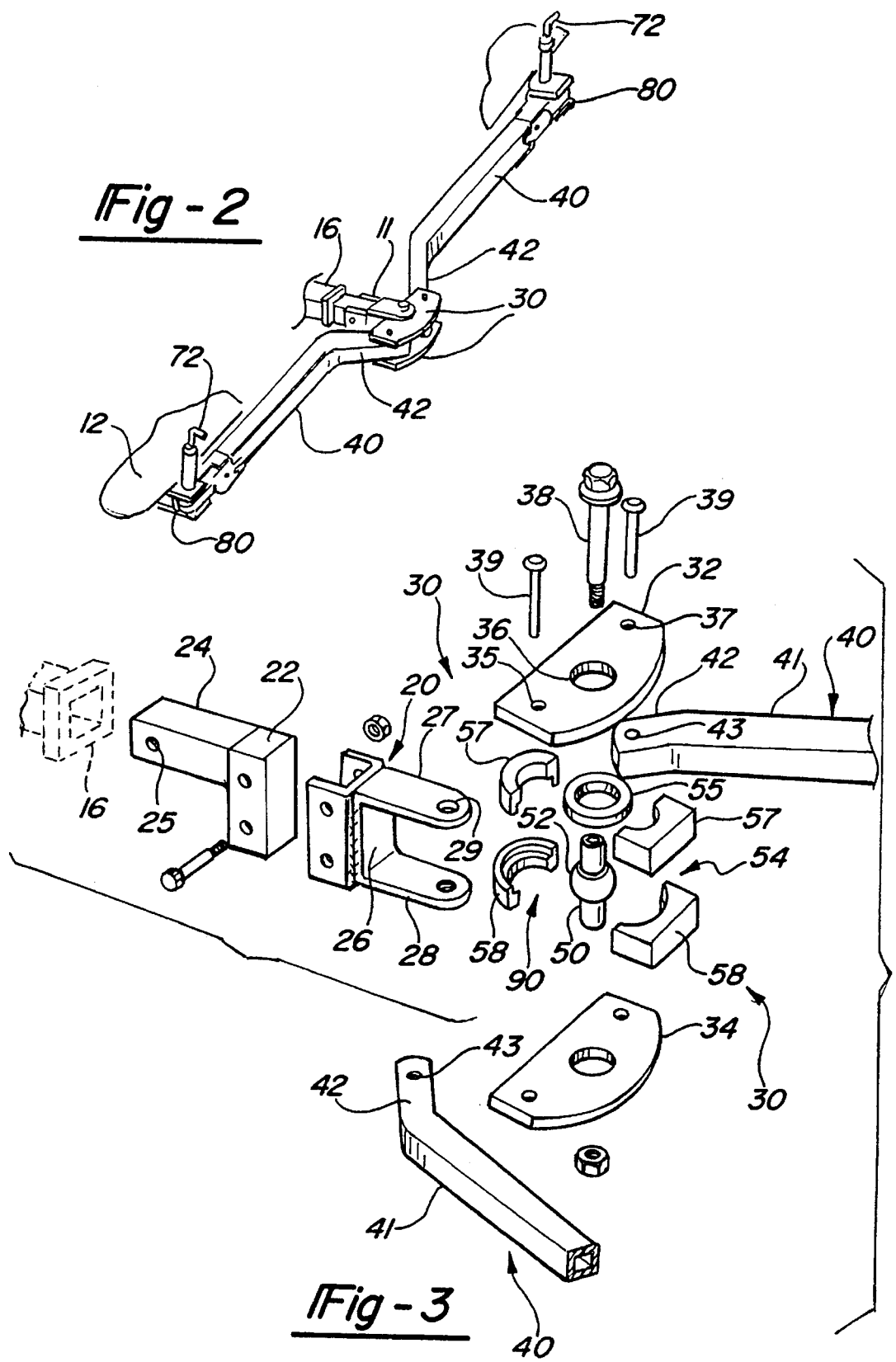

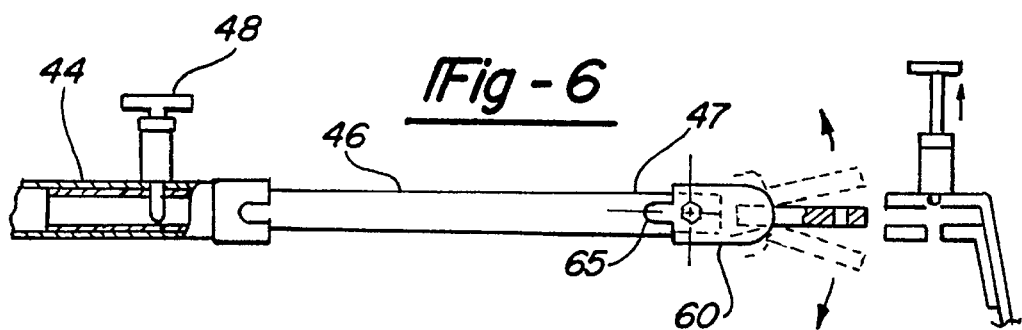
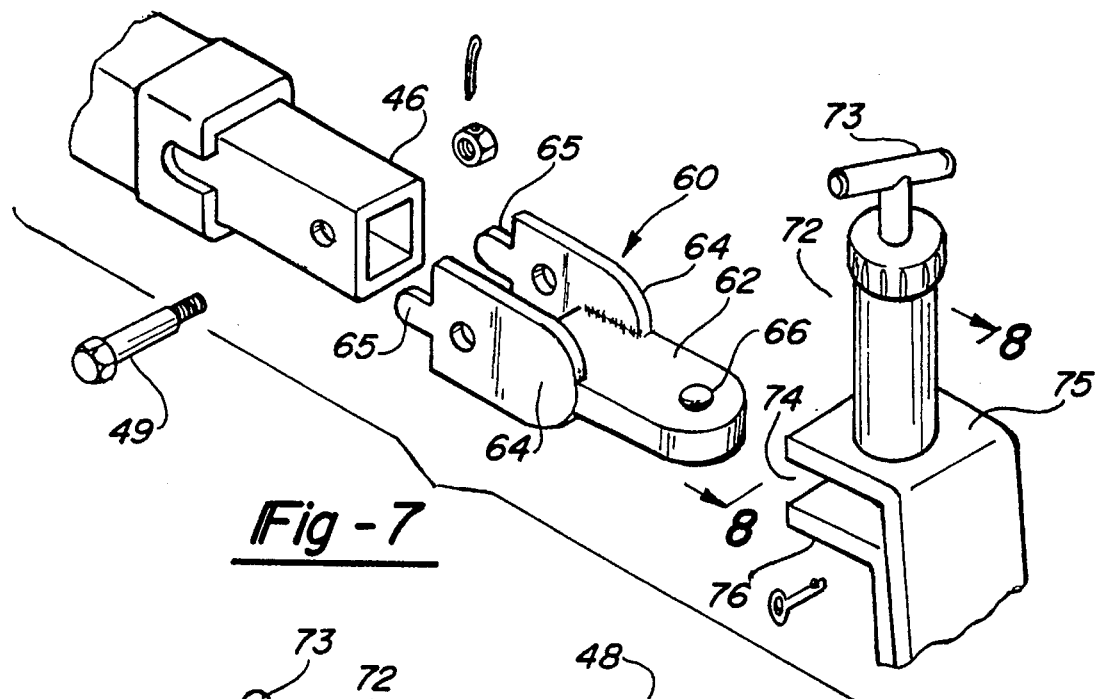
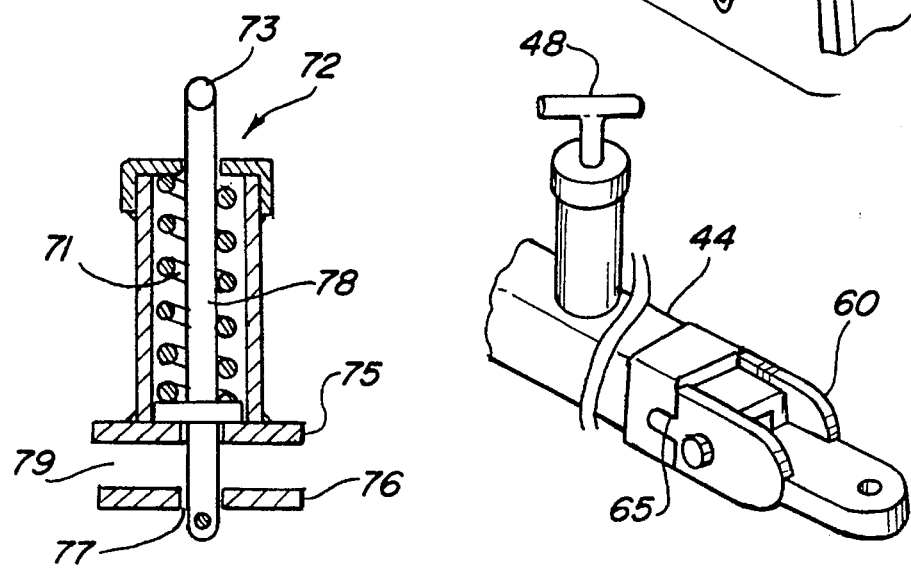

TOW BAR ASSEMBLY

BACKGROUND OF THE INVENTION

1. Field of the Invention

The present invention relates to a tow bar extending between a towing vehicle and a towed vehicle in general, and more particularly, to a novel collapsible tow bar assembly that is easily secured to the towing vehicle when not in use.

2. Background of the Invention

As cross-country travel has become more popular over the last few decades, increasing numbers of individuals and families have turned to the recreational vehicle (RV) as a convenient, fun and exciting way to tour the country. Although the RV is well suited to cross-country driving on interstate highways and the like, city and local driving is often more difficult due to the RV's large size. The ability to tow vehicles behind the RV provides the RV owner with greater freedom and flexibility once the destination is reached. Many different tow bar designs have been used over the years in an effort to properly couple the towed vehicle to the RV. Convenience, safety and ease of operation are increasingly becoming important considerations in tow bar design since an ever larger percentage of the cross-country travelers today are senior citizens and retirees.

A tow bar in use today is that disclosed in U.S. Pat. No. 4,856,805 issued to Davis. Davis discloses a triangular shaped collapsible tow bar that is secured to the towed vehicle when not in use. The tow bar extends from the towed vehicle and connects to the hitch ball attached to the RV. Since the tow bar in Davis is secured to the front end of the towed vehicle when not in use, the tow bar necessarily protrudes from and adds extra weight to the front end of the towed vehicle. The extra weight and bulk on the front end may reduce the driveability of the car. Moreover, use of a towing ball extending from the rear of the RV to couple to the tow bar requires that the user carefully align the towed vehicle with the RV.

An improvement of the Davis tow bar is disclosed in U.S. Pat. No. 5,232,240 issued to Johnson. Johnson discloses a collapsible tow bar that may be removably installed on a receiver hitch of a towing vehicle. The tow bar includes a frame and a pair of elongated bars that extend rearward from the frame and provide for the connection with the vehicle to be towed. The bars are connected to a pivot block which is mounted to the forward portion of the frame, so as to permit the pivot block and bars to pivot from a horizontal position to a generally vertical storage position. The pivot block is mounted such that the bars are rotatable as a unit along an axis parallel to the direction which the vehicle is towed. Hooks are mounted at the ends of the elongated bars and provide for connection with U-shaped loops mounted to the bumper of the towed vehicle.

While Johnson solved some of the problems of the prior art, namely providing a collapsible tow bar which could be stored on the towing vehicle, his invention failed to address some significant problems, including providing for the smooth movement of the swing arms in planes parallel and perpendicular to the movement of the towed vehicle.

Accordingly, it is therefore a general object of the present invention to provide an improved tow bar assembly that is economical to manufacture, compact, light weight, simple to use, and can be used on a variety of different vehicles.

It is a further object of the present invention to provide a tow bar assembly that is collapsible, and quickly and easily stored on the towing vehicle when not in use.

It is a further object of the present invention to provide a tow bar system that may be readily extended for towing purposes and simply connected to the towed vehicle.

It is a further object of the present invention to provide a tow bar system that incorporates a yoke and ball joint to provide increased flexibility of movement along axes both parallel and perpendicular to the direction of vehicle motion to facilitate towing on uneven or bumpy terrain.

In accordance with these and many other objects, I have invented a unique tow bar assembly that solves the problems that others have failed to address.

SUMMARY OF THE PRESENT INVENTION

The tow bar system of the present invention includes a frame having a bearing element secured to the front end of the frame and a mounting element secured to the rear end of the frame. The mounting element is adapted to be selectively connected to the receiver hitch of a towing vehicle, while the bearing element extends rearward toward the towed vehicle. A pair of elongated, telescopic swing arms are pivotally secured to the bearing element and extend to the towed vehicle for attachment thereto. The bearing element further includes a yoke rotatable about a ball joint having at least two degrees of freedom which allows for movement of the swing arms in both vertical and horizontal planes. The swing arms further include pivot flanges that are pivotally secured to the swing arms at their ends nearest the towed vehicle. The pivot flanges each have a pinhole extending therethrough that allow for connection to the towed vehicle. A pair of tow vehicle mounting brackets extend vertically upward from the frame of the towed vehicle. A removable locking pin assembly is provided for easily connecting the pivot flanges of the swing arms to the mounting brackets. When not in use, the tow bar assembly may be collapsed and securely stored adjacent the rear bumper of the towing vehicle such that in the stored position, each swing arm is parallel to the rear bumper.

BRIEF DESCRIPTION OF THE DRAWINGS

Additional objects, advantages, and features of the present invention will become apparent from the following description and appended claims, taken in conjunction with the accompanying drawings in which:

FIG. 2 is a perspective view of the present invention shown in a storage position adjacent the rear bumper of the towing vehicle;

FIG. 3 is an exploded perspective view of the mounting element and the bearing element of the present invention;

FIG. 6 is side view of a swing arm of the present invention extending toward the towed vehicle;

FIG. 7 is an exploded perspective view of a pivot flange extending between a swing arm and a locking pin assembly on the towed vehicle;

FIG. 8 is an enlarged side view of the locking pin assembly of the present invention;

FIG. 9 is a side view showing the connection between a pivot flange and a locking pin assembly.

DETAILED DESCRIPTION OF A PREFERRED EMBODIMENT OF THE PRESENT INVENTION

It should be understood that the following description of the preferred embodiment is merely exemplary in nature and is in no way intended to limit the invention or its applications or uses.

For example, the following description of the tow bar assembly, although provided for connection between a recreational vehicle and an automobile in the preferred embodiment, is intended to be typical of tow bar assemblies that may be used between a number of different towing vehicles such as sport-utility vehicles and pick-up trucks, and a number of towed vehicles such as campers, trailers, and boats. Modifications and variations of the present invention will readily occur to those skilled in the art.

Figure 1:
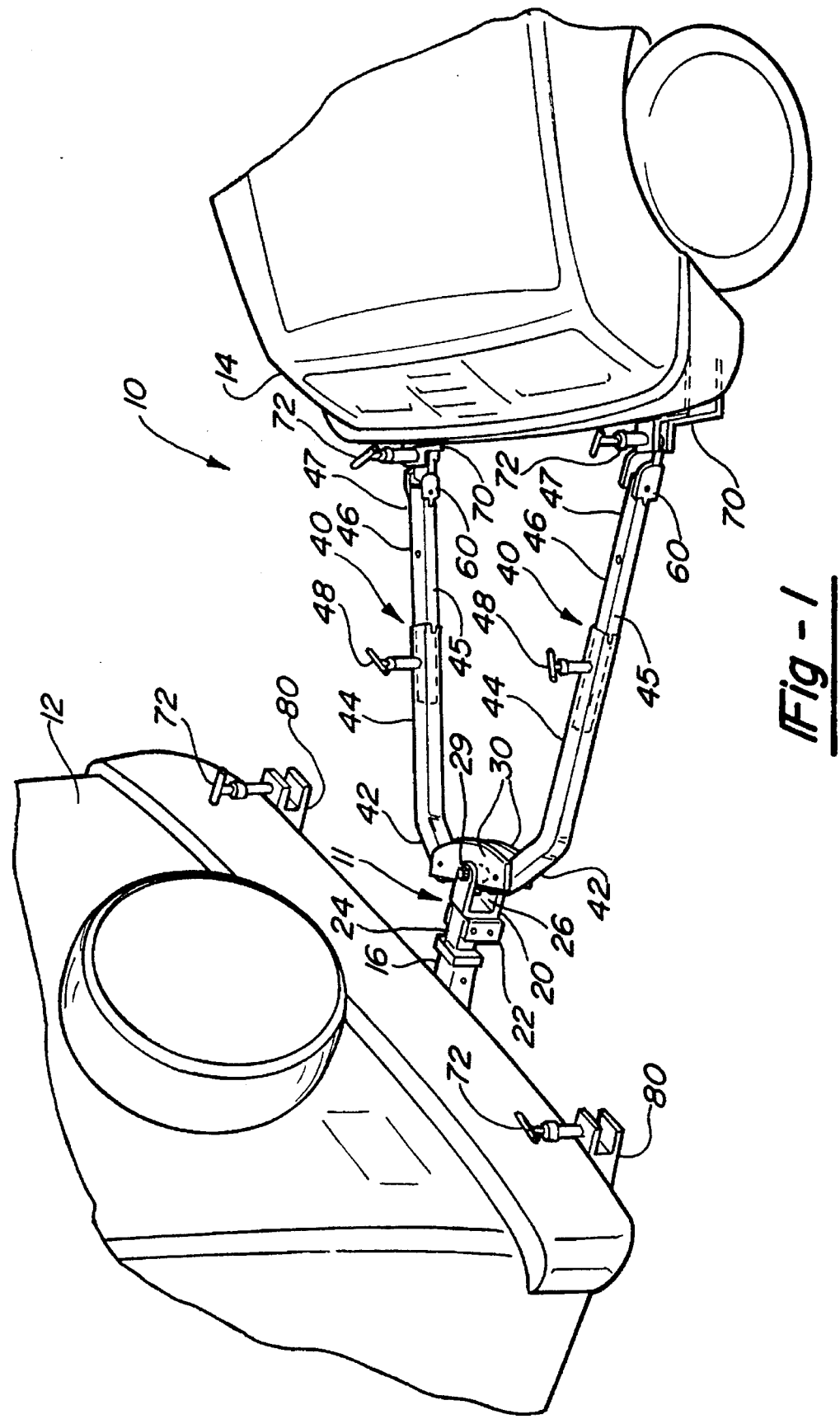
FIG. 1 is a perspective view of the present invention shown mounted in a receiver hitch and in towing position with the swing arms extended and secured to the towed vehicle.

Referring now to the drawings, in which corresponding parts are identified with the same reference numeral, and more particularly to FIGS. 1 and 3, the tow bar assembly of the present invention is designated generally at 10 and is shown mounted on a conventional hitch tube 16 extending from a receiver hitch on the back of a towing vehicle 12, such as an R.V., to the bumper of a towed vehicle 14, such as an automobile. The tow bar assembly 10 includes a frame 11 having a rearwardly extending bearing element 20 fixed to a forwardly extending mounting element 22. The mounting element 22 consists of a conventional hitch bar 24 that can be releasably inserted into the hitch tube 16. The hitch bar 24 has an aperture 25 in its side for receiving a locking pin which may be passed through the aperture 25 to secure the hitch bar 24 to the hitch tube 16.

The bearing element 20 includes a generally C-shaped member 26 having a top surface 27 and a bottom surface 28 and a bolt hole 29 extending therebetween. A yoke 30 extends between the bolt hole 29 on the top surface 27 and the bottom surface 28 (shown more particularly in FIG. 4). With reference now to FIG. 3, the yoke 30 includes an upper semicircular plate 32 and a lower semicircular plate 34 which provide pivotal attachment between the bearing element 20 and complementary swing arms, generally indicated by 40. A right aperture 35, a center aperture 36, and a left aperture 37 extend between the upper plate 32 and the lower plate 34. The center aperture 36 is aligned with the bolt hole 29 of the C-shaped member 26 and a sleeve 50 extending from the top surface 27 to the bottom surface 28 of the C-shaped member 26. A shoulder bolt 38 is provided which extends downwardly from the top surface 27 of the C-shaped member 26, through the upper semicircular plate 32 and the sleeve 50, through the lower semicircular plate 34, and finally through the bottom surface 28 of the C-shaped member 26. As shown in FIG. 3, the sleeve 50 has a ball 52 welded thereto.

The upper semicircular plate 32 and the lower semicircular plate 34 of the yoke 30 are parallel and spaced apart to receive a pair of pivotal elongated swing arms 40. As shown in FIG. 3, the right aperture 35 and the left aperture 37 are designed to receive connector bolts 39. The forward end 41 of each swing arm 40 has a projecting offset flange 42 with an aperture 43 therethrough. Complimentary bolts 39 are journaled through the right aperture 35 and the left aperture 37 of the upper plate 32, through the projecting offset flange 42 of each swing arm 40, and then through the lower plate 34. Corresponding nuts fasten the bolts in position.

Each swing arm 40, as shown in FIG. 1, is generally rectangular in cross-section and comprises an outer rail 44 and an inner rail 46, the inner rail 46 being slidably adjustable therein. The inner rail 46 has a plurality of apertures extending therethrough (not shown) that allow for the removable insertion of a pin. A locking pin assembly 48 is attached at an end of the outer rail 44 and controls the telescopic movement of the inner rail 46 with respect to the outer rail 44. The inner rail 46 includes a forward end 45 securable to the outer rail 44 and a rearward end 47 that is free to extend to the towed vehicle 14. A pivot flange 60 is secured to the rearward end 47 of the inner rail 46. As better shown in FIG. 7, the pivot flange 60 includes a planar member 62 securely attached to opposing surfaces 64. Each of the opposing side surfaces 64 includes an outwardly extending nipple 65 and each is pivotally secured to the inner rail 46 by a bolt 49 extending therethrough. The planar member 62 includes an aperture 66 for receiving a pin 78 therethrough for connection to the towed vehicle 14. As shown in FIG. 6, the pivot flange 60 is capable of movement in a vertical plane to facilitate connection to the towed vehicle 14.

Referring back now to FIG. 1, a pair of mounting brackets 70, are provided that are secured to the frame of the towed vehicle 14 and extend upward in front of the bumper of the towed vehicle 14. A locking pin assembly 72 is releasably secured to each mounting bracket 70 and provides for connection with the planar members 62 of the pivot flange 60. As shown in FIGS. 1, 6, 7 and more particularly in FIG. 8, the locking pin assembly 72 comprises a U-shaped receiving member 74 having a top parallel face 75 and a bottom parallel face 76, forming a channel 79 therebetween, each face having a corresponding aperture 77, and a spring actuated pin 78 moveable through said aperture 77 and between the channel 79. The pin 78 is moveable between its normally closed position where the pin 78 extends vertically through the aperture 77 and channel 79, and an open position where the pin 78 is pulled vertically up and away from the channel 79. The pin 78 is biased in the closed position through the action of a compression spring 71. To securely fasten the pivot flange 60 to the mounting bracket 70, the user need merely exert an upward force on the handle 73 thereby removing the pin 78 from the receiving channel 79, insert the pivot flange 60 in the channel 79, and then release the handle 73 to allow the pin 78 to extend therethrough.

As depicted in FIGS. 1 and 2, swing arms 40 are moveable from an extended position whereby the swing arms 40 extend to the towed vehicle 14 and a storage position whereby the arms are pulled back and securely fastened to the rear of the towing vehicle 12. Two retaining brackets 80 are attached to opposite ends of the rear of the towing vehicle 12, and connected to the swing arms 40 by the manipulation of locking pin assemblies 72 as described earlier. As best shown in FIG. 1, the projecting flange 42 of each swing arm 40 is slightly offset to provide a more compact storage position.

Figure 4:
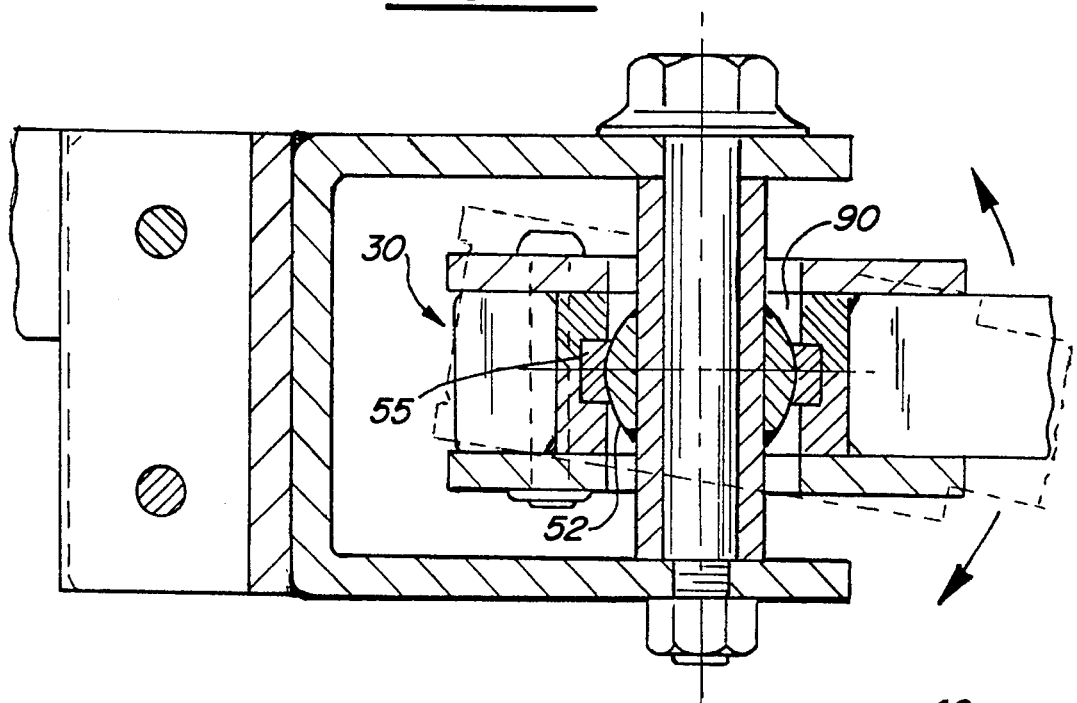
FIG. 4 is an enlarged side view of the yoke and ball joint of the present invention.
Figure 5:
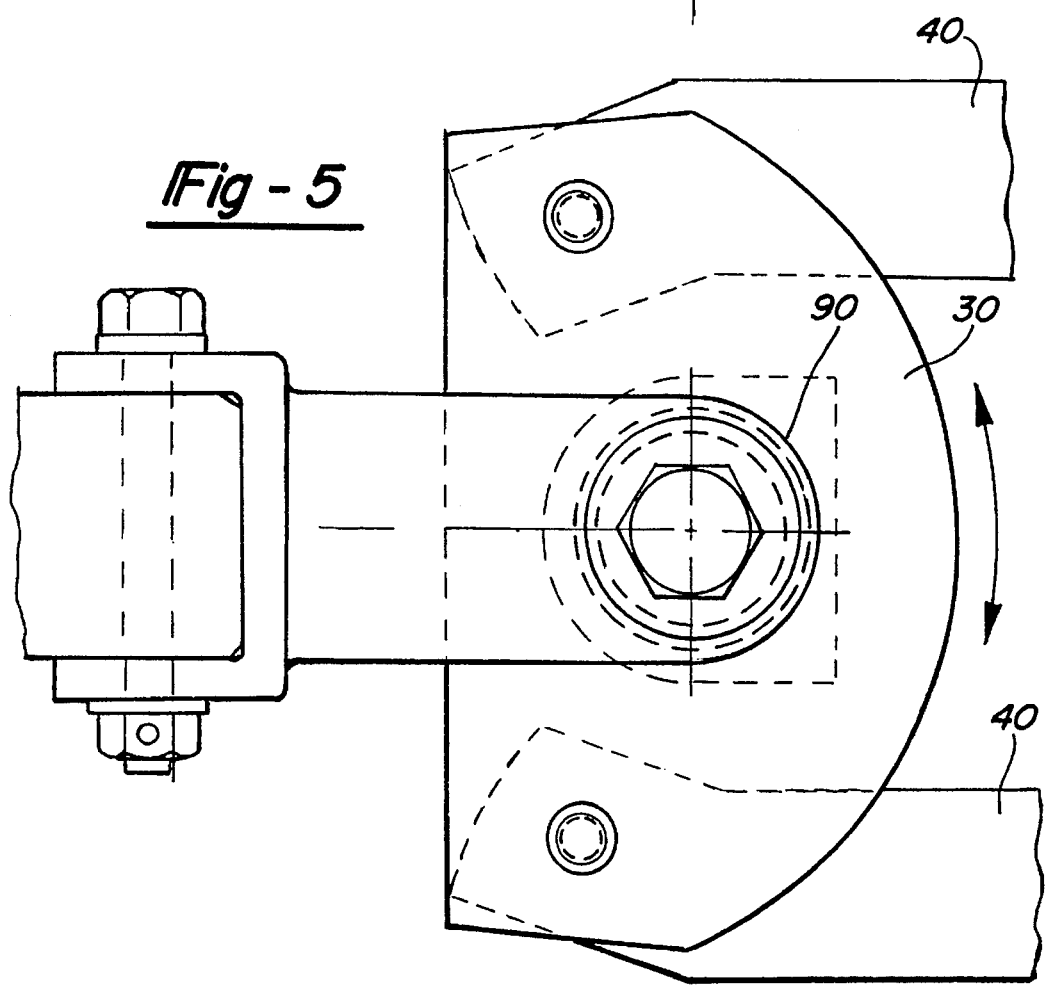
FIG. 5 is a top view of the yoke of the present invention showing the pivotal connection of the swing arms.

Referring now to FIG. 3, the yoke 30 is more particularly shown. The yoke 30 includes a vertical sleeve 50 with a substantially spherical shaped ball 52 welded between the ends of the sleeve 50. The sleeve 50 is secured to the yoke 30 through the insertion of a shoulder bolt 38 extending through the center aperture 36 of the upper semicircular plate 32 and the lower semicircular plate 34. An outer ball race 55 circumferentially surrounds the ball 52 and facilitates the universal movement of the yoke 30 about the ball 52 and sleeve 50, forming a ball joint 90. An outer race retainer 54 surrounds the ball 52 and outer race 55 and further includes two upper semicircular parts 57 and two lower semicircular parts 58. The upper parts 57 are welded to the upper semicircular plate 32 and the lower parts 58 are welded to the lower semicircular plate 34, such that the ball 52 is located therebetween. As shown in FIG. 4, the yoke 30 is moveable about the ball joint 90 in a vertical plane coinciding with the movement of the swing arms 40. Neither the ball 52 nor the sleeve 50 move with the movement of the yoke 30. The movement of the yoke 30 is dependent on the movement of outer race 55 about the ball 52 within the confines of the outer race retainer 54. As shown in FIG. 5, the yoke 30 is also rotatable in a horizontal plane about an axis defined by the ball joint 90.

The tow bar 10 is connected to the towing vehicle 12 by inserting the mounting element 22 into the receiver hitch tube 16 and inserting a locking pin therethrough, as shown in FIG. 1. Telescopic swing arms 40 may then be adjusted to the lengths necessary by manipulating the pin assemblies 48 manually or by allowing the arms to adjust automatically to the proper length as the towing vehicle begins to move forward. Swing arms 40 are then secured to the towed vehicle 14 by connecting pivot flanges 60 to the mounting brackets 70 by extending a pin therethrough. The yoke 30 is universally rotatable about the ball joint 90 and allows the tow bar assembly 10 to properly tow vehicles over bumps or grades in the road. When the towing vehicle 12 turns, the yoke 30 will pivot about the ball joint 90 to follow the movement of the towing vehicle 12. At all times, the yoke 30 maintains a parallel alignment with the bumper of the towed vehicle 14.

When the destination has been reached, the pivot flanges 60 may be easily and quickly disconnected from the towed vehicle 14 by exerting an upward force on the handle 73 of the respective pin assemblies 72. The tow bar assembly 10 may then be collapsed by sliding the inner rail 46 of swing arm 40 nearly entirely inside the outer rail 44. As shown in FIG. 9, the nipples 65 of the pivot flanges 60 prevent sliding the inner rail 46 entirely into the outer rail 44 and ensure that the pivot flanges 60 are no longer pivotal. Each swing arm 40, independently, may then be pulled back and secured to respective retaining brackets 80 on the towing vehicle 12. In the stored position, the swing arms 40 are parallel to the rear of the towing vehicle 12.

As will be apparent to one of ordinary skill in the art, the preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

Having thus described my invention, I claim:

1. A tow bar assembly adapted to extend between a towed vehicle and a towing vehicle, comprising:

a frame having a mounting element at its forward end for removable connection to the towing vehicle;

a bearing element having a top surface and a bottom surface secured to the frame at its rear end;

a vertical sleeve extending between said top and bottom surfaces of said bearing element, said sleeve having a substantially spherical ball welded thereto forming a ball joint;

a yoke, including an upper plate spaced apart from a lower plate, said plates including bearing surfaces, said yoke operably connected to said spherical ball by means of said bearing surfaces;

a pair of elongated swing arms having a first end pivotally connected to and extending from the yoke to the towed vehicle and a second end, the swing arms universally moveable in conjunction with the yoke and about the ball joint, the swing arms moveable from a first position whereby the second end of the swing arms extend to the towed vehicle and a second position whereby the second end of the swing arms are secured to the towing vehicle;

a pair of mounting brackets secured to the towed vehicle being adapted to removably receive the swing arms when the swing arms are in the first position; and a pair of retaining brackets secured to the towing vehicle being adapted to removably receive the swing arms when the swing arms are in the second position.

2. The tow bar of claim 1, wherein the ball joint includes an outer ball race having a circular ring rotatable about the circumference of the ball, an outer race retainer surrounding the ball and having two upper semicircular sections welded to the upper plate and two lower semicircular sections welded to the lower plate such that the outer ball race is moveable therein.

3. The tow bar of claim 1, wherein each of the swing arms further comprises:

an outer rail pivotally secured to the yoke;

an inner rail, guided in the outer rail and slidably received therein;

a locking pin assembly mounted on the outer rail and adapted to adjustably secure the inner rail to the outer rail and to facilitate telescopic movement of the inner rail with respect to the outer rail;

a pivot flange pivotally connected to the inner rail at an end nearest the towed vehicle, the pivot flange having a pinhole extending therethrough; and means for connecting the pivot flange to the towed vehicle.

4. The tow bar of claim 3, wherein said means for connecting the pivot flange to the towed vehicle comprises:

a tow vehicle mounting bracket having first and second ends, said first end adapted to be secured to a frame of the towed vehicle and said second end extending outwardly from the vehicle;

a locking pin assembly having a receiving member having top and bottom parallel faces forming a channel therebetween for receiving said first and second pivot flanges, said top and bottom faces having an aperture therethrough; and a spring actuated pin moveable in the aperture between an open position where said pin is extended vertically away from said channel such that said pivot flanges may be removably inserted into said channel and a closed position, wherein said pin extends through the aperture.

5. The tow bar of claim 1, wherein the yoke is rotatable about ball joint, the yoke having at least two degrees of freedom.

6. The tow bar assembly of claim 1, wherein the mounting element further includes a hitch bar insertable into a hitch tube of the towing vehicle.

7. The tow bar assembly of claim 1, wherein said retaining brackets are substantially C-shaped, both having top and bottom parallel faces forming a channel therebetween for receiving said swing arms.

8. A tow bar assembly, comprising:

a frame having a mounting element at its forward end having a hitch bar insertable into a hitch tube of a towing vehicle;

a bearing element, secured to the mounting element, having a top surface and a bottom surface;

a vertical sleeve extending between said top and bottom surfaces of said bearing element, said sleeve having a substantially spherical ball welded thereto;

a yoke universally rotatable about said ball, the yoke including an upper plate spaced apart from a lower plate, said plates having at least one aperture thereon;

the yoke including an outer ball race having a circular ring rotatable about the circumference of the ball thereby forming a ball joint, an outer race retainer surrounding the ball and having two upper semicircular sections welded to the upper plate and two lower semicircular sections welded to the lower plate such that the outer ball race is moveable therein;

a pair of elongated swing arms having a first end pivotally connected to and extending from the yoke to the towed vehicle, and a second end, the swing arms universally moveable in conjunction with the yoke, each of said swing arms comprising an outer rail pivotally secured to the yoke, an inner rail, guided in the outer rail and slidably received therein, a locking pin assembly mounted on the outer rail and adapted to adjustably secure the inner rail to the outer rail and to facilitate telescopic movement of the inner rail with respect to the outer rail, a pivot flange pivotally connected to the inner rail at an end nearest the towed vehicle, the pivot flange having a pinhole extending therethrough, and means for connecting the pivot flange to the towed vehicle.

* * * * *